(12) United States Patent
Kingsley et al.

(10) Patent No.: US 11,797,950 B2
(45) Date of Patent: Oct. 24, 2023

(54) METHOD AND SYSTEM TO DIGITALLY TRACK AND MONITOR AN AUTOMOTIVE REFINISH REPAIR PROCESS

(71) Applicant: BASF Corporation, Florham Park, NJ (US)

(72) Inventors: Kevin Kingsley, Southfield, MI (US); Manjusha Khaire, Southfield, MI (US); Tim Wilder, Hamilton (CA)

(73) Assignee: BASF CORPORATION, Florham Park, NJ (US)

( * ) Notice: Subject to any disclaimer, the term of this patent is extended or adjusted under 35 U.S.C. 154(b) by 961 days.

(21) Appl. No.: 16/113,074

(22) Filed: Aug. 27, 2018

(65) Prior Publication Data
US 2020/0065776 A1 Feb. 27, 2020

(51) Int. Cl.
*G06Q 10/00* (2023.01)
*H04W 4/021* (2018.01)
*H04L 67/52* (2022.01)
*H04L 67/55* (2022.01)
*G06Q 10/20* (2023.01)

(52) U.S. Cl.
CPC ............. *G06Q 10/20* (2013.01); *H04L 67/52* (2022.05); *H04L 67/55* (2022.05); *H04W 4/021* (2013.01)

(58) Field of Classification Search
CPC ......... G06Q 10/20; H04L 67/26; H04L 67/18; H04L 67/12; H04L 67/52; H04L 67/55; H04W 4/021
USPC ........................................................ 705/305
See application file for complete search history.

(56) References Cited

U.S. PATENT DOCUMENTS

| 8,145,186 | B1* | 3/2012 | Vaughan | H04W 24/08 455/448 |
| 2002/0198618 | A1* | 12/2002 | Madden | B62D 65/02 700/115 |
| 2003/0047954 | A1* | 3/2003 | Corder | B60J 7/047 296/37.16 |
| 2007/0152107 | A1* | 7/2007 | LeFebvre | B61K 13/00 246/169 R |

(Continued)

FOREIGN PATENT DOCUMENTS

| CN | 1125674 A | * | 7/1996 |
| CN | 101751793 B | * | 8/2012 |

(Continued)

OTHER PUBLICATIONS

Yemao Man, "Energy-Efficient Automatic Location-Triggered Applications on Smartphones", Mar. 2014, Computer Communications, pp. 29-40. (Year: 2014).*

(Continued)

*Primary Examiner* — Tan D Nguyen
(74) *Attorney, Agent, or Firm* — Armstrong Teasdale LLP

(57) ABSTRACT

The present invention refers to a method and a system to digitally track and monitor an automotive refinish repair process of a car within a car body shop. The car to be repaired is provided with at least one beacon inside the car and the car body shop is divided into a plurality of function-specific, geo-fenced areas, each geo-fenced area being served by at least one communication node. The at least one communication node is in communicative connection with a cloud server which provides, based on collected data of the repair process, push reports and/or notifications and/or alerts via a user interface.

16 Claims, 2 Drawing Sheets

(56) References Cited

U.S. PATENT DOCUMENTS

| | | | | |
|---|---|---|---|---|
| 2013/0227334 | A1* | 8/2013 | Wang | G06Q 10/08 |
| | | | | 714/E11.078 |
| 2016/0142868 | A1* | 5/2016 | Kulkarni | H04W 4/80 |
| | | | | 455/456.5 |
| 2016/0307645 | A1* | 10/2016 | Kim | G11C 29/76 |
| 2017/0039517 | A1* | 2/2017 | Amann | H04W 4/023 |
| 2018/0321356 | A1* | 11/2018 | Kulkarni | H04W 64/003 |
| 2018/0330293 | A1* | 11/2018 | Kulkarni | G06Q 10/0633 |
| 2019/0102749 | A1* | 4/2019 | Vijayan | G06Q 10/20 |
| 2021/0319412 | A1* | 10/2021 | Kingsley | G06Q 10/06312 |

FOREIGN PATENT DOCUMENTS

| | | | | |
|---|---|---|---|---|
| CN | 103476133 | A * | 12/2013 | |
| DE | 3209222 | A * | 9/1983 | |
| KR | 20040055063 | A * | 6/2004 | |
| WO | WO-2006024423 | A1 * | 3/2006 | G01R 31/007 |
| WO | WO-2007120280 | A2 * | 10/2007 | G01N 21/9501 |
| WO | 2017060781 | A1 | 4/2017 | |

OTHER PUBLICATIONS

S.W. Rahate, "Geo-fencing Infrastructure: Location based service", 2016, International Research Journal of Engineering and Technology (IRJET), vol. 3, Issue: 11, pp. 1095-1098. (Year: 2016).*

Mai Al-Sebae, "Big Issues fora Small Piece RFID Ethical Issues", 2015, ICIT 2015 The 7th International Conference on Information Technology, pp. 351-356. (Year: 2015).*

Efstathiadis Doukas, "Advanced Technologies for Fleet Management Systems", 2011, International Hellenic University, Program MBA 2009, pp. 1-57 (Year: 2011).*

Ebrahim Nemati, "Opportunistic Environmental Sensing with Smartphones: a Critical Review of Current Literature and Applications", 2017, Current Envir Health Rpt (2017) 4:306-318. (Year: 2017).*

Marshall Sponder, "Geo-Location Analytics", 2017, Book "Digital Analytics for Marketing," Abstract. (Year: 2017).*

* cited by examiner

METHOD AND SYSTEM TO DIGITALLY TRACK AND MONITOR AN AUTOMOTIVE REFINISH REPAIR PROCESS

BACKGROUND

The present invention refers to a method and a system to digitally track and monitor an automotive refinish repair process of a car within a car body shop.

Business owners have a business need to improve efficiencies, increase quality by reducing costs and unnecessary steps, increase business by advertising transparency and accuracy of their processes, reduce single person dependency by using software tools to support resource needs and provide process reliability and sustainability, increase confidence in process. By better being able to monitor tools, personnel, vehicles to be repaired and other resources within a car body shop, less time will be spent to locate them, a probable inactivity can be understood and wasted movements can be easily discovered and proactive processes to continue to improve the running processes can be implemented.

WO 2017/060781 A1 refers to a system and a method for automatically clocking times in a workshop and/or at a car dealer. The automatic time-clocking method operates by means of a calculation of a proximity of an operator to a vehicle to be repaired, and in this way optimises a repair process affected by bottlenecks, implementation of repair operations, workshop workload, efficiency, and need for replacement parts and communication with an owner of the vehicle for authorisation.

However, this document does not teach a possibility to digitally track and monitor a repair process and to provide a user with real-time information about the repair process for that the user can immediately interfere. There is also no teaching about an aggregation of data coming from different data sources in order to provide an overview of a current status of the repair process in real-time.

BRIEF DESCRIPTION

It was therefore an object of the present invention to provide a method and a system which allow to digitally track and monitor an automotive refinish repair process of a car within a car body shop in order to improve a performance of the respective car body shop.

This is achieved according to the invention by a method according to claim 1 and a system according to claim 10 and a computer program product according to claim 16. Further embodiments can be derived from the respective dependent claims and the following description.

In addition, other objects, desirable features and characteristics will become apparent from the subsequent summary and detailed description, and the dependent claims, taking in conjunction with the accompanying drawings.

A method to digitally track and monitor an automotive refinish repair process of a car within a car body shop is provided. The car to be repaired is provided with at least one beacon at and/or inside the car and the car body shop is divided into a plurality of geo-fenced areas. Each geo-fenced area is served by at least one communication node. The method comprises at least the steps of:

a) navigating the car through at least some of the plurality of geo-fenced areas according to a pre-given execution plan schedule, b) as soon as the car enters one of the geo-fenced areas: picking up the at least one beacon at and/or inside the car by the at least one communication node and reporting/signalling accordingly determined location/position data of the car to a cloud server, and capturing, by the at least one communication node serving the one geo-fenced area, for the residence time of the car within the one geo-fenced area from at least one beacon inside the one geo-fenced area and being assigned to at least one item to be tracked, data/signals and transmitting the captured data to the cloud server.

c) processing the captured data in the cloud server, d) updating a repair stage of the car in a log file and/or a database/data repository located in the cloud based on the processed data, particularly when the car leaves the one of the geo-fenced areas, e) providing, based on the processed data and the updated repair stage, push reports and/or notifications and/or proactive alerts via a user interface, and f) moving, particularly automatically, the car to one subsequent geo-fenced area according to the execution plan schedule and repeating steps b) to e) until the car reaches a last geo-fenced area according to the execution plan schedule and/or until an erroneous event is detected.

In the following, the terms "car" and "vehicle" are used synonymously and mean all kind of vehicles which might have to undergo a repair process.

The data which are captured within the one geo-fenced area can be time and/or activity and/or status data of the car to be repaired and/or of any item to be tracked wherein the data are relevant for the automotive refinish repair process.

Generally, there is more than one beacon, particularly for each kind of item to be tracked at least one beacon. Generally, each beacon is assigned, particularly attached to one item to be tracked. A respective beacon may be located at the item to which it is assigned to. The at least one beacon inside the one geo-fenced area from which the data are captured may be chosen from but may not be limited to the group comprising the car to be repaired, an employee of the car body shop, a part, a parts cart, a key, a tool, etc. That means that as long as the car to be repaired resides within the one geo-fenced area, data are collected from all beacons from all items which are to be tracked inside the one geo-fenced area and which are relevant for the refinish repair process. Each beacon is configured to establish a communicative connection to the at least one communication node serving the one geo-fenced area when being located in an appropriate distance to the at least one communication node, particularly when being located inside the one geo-fenced area. As at least some of those items to be tracked are mobile, they can move, similar to the car to be repaired, from the one geo-fenced area to the subsequent geo-fenced area. Generally, not only data from the at least one beacon at and/or inside the car to be repaired are collected but also data from further beacons assigned to further items to be tracked are collected as long as those beacons, i.e. the respective items are located in such vicinity to the at least one communication node serving the one geo-fenced area so that the beacons are in a communicative connection to the at least one communication node. The at least one communication node serving the one geo-fenced area is configured to collect all data measured and/or sensed by all beacons within the one geo-fenced area. Each beacon may have sensing capabilities of at least one sensor from the group of sensors comprising: a chronometer, a hygrometer, a cinometer, a proximity meter, a thermometer, a gas meter. According to one embodiment, only one beacon for each item to be tracked is needed to encompass/realise all the above mentioned sensor capabilities and to track all the different kind of data.

The at least one communication node can be part of any kind of communication network, such as a wired network, for example a local area network (LAN) or a wide area network (WAN) and/or a wireless network, for example a wireless local area network (WLAN) and/or a short-range wireless network, such as Bluetooth. The communication node can operate as a gateway between two different communication networks that relays signals between the at least one beacon which is accessible via one of the two networks, and the cloud server which is accessible via the other one of the two networks. The communication node can be, for example, configured as a Bluetooth Low-Energy (BLE) to WLAN, e. g. WiFi gateway that relays signals between the at least one beacon and the cloud server which is accessible via WLAN, e. g. WiFi. In that case the at least one beacon is a small Bluetooth radio transmitter.

It is possible that the geo-fenced areas overlap with each other. Alternatively, it is also possible that the geo-fenced areas are geographically clearly separated from each other. It is also possible that some geo-fenced areas overlap with other geo-fenced areas and that some other geo-fenced areas are clearly separated from the other geo-fenced areas of the plurality of geo-fenced areas.

The different geo-fenced areas are assigned to different working stations of the car body shop, respectively. The geo-fenced areas are designed within pre-given parameters of a topology of communication nodes so that each geo-fenced area is served by at least one communication node.

Entering of the car into one geo-fenced area triggers the picking up of the at least one beacon at and/or inside the car by the at least one communication node serving the one geo-fenced area. Further, the picking up of the at least one beacon which is assigned to the car and located at and/or inside the car causes the at least one communication node to collect/capture data from different beacons, including but not limited to position data of fixed and mobile entities each being equipped with at least one beacon, such as tools, personnel, equipment inside the one geo-fenced area, humidity data inside the one geo-fenced area, temperature data inside the geo-fenced area, and different time data. In order to measure position data of fixed and mobile entities, each such entity must be equipped with a suitable tag/beacon which can be sensed by the at least one communication node.

The collected beacon data are processed by the cloud server. Thereby, the different beacon data are analysed, probably filtered and appropriately merged. On the basis of the merged data, the repair stage of the car is updated and further conclusions about the repair process can be drawn.

According to a further embodiment, the processed data and updated repair stage are transmitted together with a push report and/or a notification and/or an alert, particularly a proactive alert from the cloud server to a dashboard.

According to another embodiment, the dashboard is designed as a mobile application which can be installed and implemented on a mobile device. The dashboard provides a graphical user interface which is configured to announce information to a user so that the user is enabled to recognize and identity problems and causes of those problems, such as bottlenecks so that he can further improve the automotive refinish repair process. The dashboard can also be designed as a website which is accessible via a computer and/or a mobile device.

The dashboard can further provide information about the car to be repaired and/or about respective customers.

In any case, the user interface allows the user to view at a glance an actual status of an automotive refinish repair process on an appropriate display. The display can be part of any computing device such as a PC, a laptop, a mobile device, such as a PDA or a smartphone, which are in a communicative connection with the cloud server. Such a communicative connection can be realized/established as a wireless communicative connection, particularly via a web-based access, or a wired communicative connection.

A "communicative connection", or a connection by which entities are operably connected, is one in which signals, physical communications, and/or logical communications may be sent and/or received. A communicative connection includes a physical interface, an electrical interface, and/or a data interface, but it is to be noted that a communicative connection may include differing combinations of these or other types of connections sufficient to allow operable control. Two entities, for example, can be in a communicative connection with each other by being able to communicate signals to each other directly or through one or more intermediate entities like a processor, operating system, a logic, software, or other entity. Logical and/or physical communication channels can be used to create a communicative connection.

"Signal", as used herein, includes but is not limited to one or more electrical or optical signals, analog or digital signals, data signals, data packets or other network formatted signals, clock signals, one or more computer or processor instructions, messages, a bit or bit stream, combinations of the above, or other means that can be received, transmitted and/or detected.

"User", as used herein, includes but is not limited to one or more persons, software, computers or other devices, or combinations of these.

As portable/mobile communication devices become common belongs to everyone in modern society, it is preferred to establish as communicative connection a completely wireless communicative connection between the cloud server and a respective communication device with an appropriate display. For example, mobile phones, personal digital assistants, smartphones and tablet computers are widespread as communication devices in various applications. It is possible that the data and/or the notifications and/or the push reports and/or the alerts are transmitted from the cloud server to such a respective communication device via a cellular network, e.g. a mobile network based on a protocol of GSM, CDMA or WCDMA. Alternatively, it is also possible that the data/signals are transmitted via an intermediate device such as an access point of a local area network (LAN). However, in this case, the cloud server and the respective communication device must connect to the same intermediate device before exchanging information.

Further, it is possible that the cloud server in the case that it is located within a certain distance from the communication device may directly transmit information to the communication device via a peer-to-peer network.

In the case of wired communicative connections, the connection can be realized via copper cables or via glass-fibre.

It is also possible that the communicative connection between the user interface established on a respective communication device and the cloud server is a combination of a wired technology and a wireless technology. That means that a part of the communicative connection between the cloud server and the communication device is established by means of a copper cable and/or a glass-fibre and a remaining part of the communicative connection is realized wireless.

The usage of a cloud server enables ubiquitous access to shared pools of configurable system resources and services that can be provided particularly over the internet. The cloud server provides a network cloud service or application, web-based (i.e. accessed via a uniform resource locator (URL)) or native. Examples include software as a service (SaaS) offerings, platform as a service (PaaS) offerings and infrastructure as a service (IaaS) offerings as well as internal car body shop applications that are exposed via URLs.

According to a further embodiment of the proposed method, the reports and/or notifications and/or alerts are dynamically generated and transmitted to the user interface on a regular basis. A dynamic generation of reports and/or notifications and/or alerts is to be understood as the provision of such reports and/or notifications and/or alerts during the automotive refinish repair process is still running. This allows a user viewing the reports and/or notifications and/or alerts provided via the user interface to immediately act on the automotive refinish repair process, particularly to interrupt the automotive refinish repair process in the case that an erroneous event is detected. The wording "on a regular basis" is to be understood as a pre-given time interval within which such reports are automatically transmitted. The time interval can be pre-given by a user or it can be pre-set in the system intrinsically. Alternatively, it is also possible that a user requests to issue the reports and/or notifications and/or alerts and that the requested reports and/or notifications and/or alerts are downloaded from the cloud server to the user interface on demand.

According to a further embodiment of the proposed method, the output of the reports and/or notifications and/or alerts is in the form of plain text, HTML, or file attachments such as PDF or Excel. Any other suitable form is possible.

According to a further embodiment of the proposed method, a user is only allowed to view the reports and/or notifications and/or alerts via the user interface when the user has appropriate access rights. That means that the user which wants to have access or who wants to view the reports and/or notifications and/or alerts via the user interface has to authenticate himself by means, for example, of the input of a key which has been agreed beforehand. It is possible that each user who wants to get access or who wants to get be provided with notifications and/or alerts and/or reports has to subscribe himself to a participation in the automotive refinish repair process and all information about this automotive refinish repair process. That means that the user has to subscribe for the service provided by the proposed method to get automatically reports, notifications and/or alerts via the user interface. Generally, any kind of suitable cryptographical method is possible to be used here.

According to a further embodiment of the proposed method, the user can manage the user interface and can instantiate user specific filters for the push reports and/or notifications and/or alerts which are to be provided via the user interface. That means that the user can manage report templates via the user interface, and can decide, for each report template, for example, a periodicity of the report sending process, as well as content of the respective report.

According to still a further embodiment of the proposed method, the at least one communication node is configured to capture data/signals within the one geo-fenced area which is served by said at least one communication node concerning anyone of the following:

Temperature, VOCs (volatile organic compounds), humidity, time offsite, time onsite, time outside, movement of the car, movement of personnel, movement of tools, movement of parts, movement of carts, movement of large equipment inside the respective geo-fenced area, activity of the car, activity of personnel, activity of tools, activity of parts, activity of carts, activity of large equipment inside the one geo-fenced area, status of the car, status of personnel, status of tools, status of parts, status of carts, status of large equipment inside the one geo-fenced area.

"Time offsite" means that the vehicles/cars are required to spend time for sublet repair work like alignments, glass replacement, interior repair, mechanical repair or any additional required work that the car body shop does not offer.

"Time onsite" is time spent at the car body shop location.

"Time outside" refers to time spent in a parking lot while the car is not being worked on. Example reasons as to why a car would be waiting in the parking lot are but not limited to insurance approval, customer approval, waiting for parts, waiting for the next phase of the repair process to start, coatings curing, waiting for customer pickup, etc.

That means that there is a plurality of beacons, each beacon being assigned to one item to be tracked and configured to measure and/or sense at least one kind of the above mentioned data. It is possible that such a beacon consolidates sensing capabilities for a plurality or all of the above mentioned data. The plurality of geo-fenced areas is what differentiates where the time spent of each beacon is tracked.

When the car enters one of the plurality of geo-fenced areas, the car is detected via the picking-up of the beacon at and/or inside the car which causes the communication node serving the one geo-fenced area to capture/collect beacon data from the different beacons within the one geo-fenced area.

As each geo-fenced area of the plurality of geo-fenced areas is assigned to a working station of the car body shop or to a parking lot of the car body shop, the collected beacon data within the one geo-fenced area give information about a current status of the respective one working station or of the respective one parking lot and, thus about the repair process.

As already mentioned before, it is also possible that the push reports and/or notifications and/or alerts are provided via the user interface instantaneously during operation, i.e. during the automotive refinish repair process. Such a compiled notification can be in the form of an inspection sheet.

The execution plan schedule, also called repair plan schedule, defines exactly how and according to which sequence of repair steps the automotive refinish repair process should be undertaken. It details the specific activities in the repair, the resources applied to the repair and the organization of the repair.

According to the present invention, the car body shop is divided in real-world purpose specific geographic areas, each such real-world geographic area being assigned, for example, to a specific working station of the car body shop where at least one specific repair step of the automotive refinish repair process is to be performed, or to a parking lot of the car body shop. Each such real-world geographic area of the car body shop is assigned a geo-fence as a virtual parameter. Such geo-fencing of the car body shop, used with car location services, allows to notify a user about the location and the movement of a car within the car body shop, any human being within the car body shop or any other tool or equipment used within the car body shop. Such geo-fencing is used to monitor and control working stations, employees and/or steps of the automotive refinish repair process performed inside the car body shop. Using geo-fencing, it is possible to log the car's attendance using the beacon at and/or inside the car when the car is within one of the geo-fenced areas. Further, geo-fencing in the meaning of the present invention allows to locate a car within the car body shop, the car being equipped with a beacon allowing a precise location inside the car body shop when being picked-up by a respective communication node serving at least one of the plurality of geo-fenced areas. It is also possible that there are some beacons which are fixedly installed in a working station and tracked by the at least one communication node serving said working station, i.e. said geo-fenced area which is assigned to said working station, as soon as the car to be repaired enters said geo-fenced area and is located/sensed by the at least one communication node. Further beacons are attached to mobile items which are also to be tracked inside said geo-fenced area when the car is within said geo-fenced area.

The at least one beacon and the respective communication node in communicative connection realize a location-aware instrument.

The at least one communication node can be, as already mentioned, a gateway between a Bluetooth and a WLAN, e. g. WiFi network. In that case, the at least one beacon at and/or inside the car is a small Bluetooth radio transmitter which allows to repeatedly transmit a single signal that the at least one communication node serving the respective geo-fenced area which is entered by the car, can receive and see. That means that the communication node serving one of the geo-fenced areas can see the beacon at and/or inside the car once the car is inside the one geo-fenced area. Thus, the location of the car can be easily identified as each geo-fenced area whose real-world geographic position is known, is served by at least one communication node.

Generally, the communication nodes are placed approximately 10 meters apart. The geo-fenced areas are created within the parameters of the placement/topology of the communication nodes and it is likely that a communication node will be seen from multiple geo-fenced areas, i.e. a communication node serves multiple geo-fenced areas.

In order that a light beam appears from the at least one beacon at and/or inside the car, the at least one beacon has to be activated. This applies to all beacons whose data are to be captured wherein each beacon is assigned to an item to be tracked within the car body shop.

According to the above-mentioned embodiment, the beacons use Bluetooth low energy (BLE) or the Bluetooth smart technology. The range of the beacons is ten to thirty meters. The communication node serving the respective geo-fenced area is enabled to receive the signals from the beacons. In order to do so, the communication node has to support the Bluetooth low energy or the Bluetooth smart technology. The perception of the signal of the beacon within the car allows to determine the position of the car depending on which communication node serving which geo-fenced area receives the respective signal. It is also possible, depending on the distance the car has from the respective geo-fenced areas, that more than one communication node serving the respective geo-fenced areas receive the signal, but on the basis of the intensity of the received signal, it is possible to clearly identify the accurate position of the car. Further, this allows a directed navigation of the car through the plurality of geo-fenced areas.

It is also possible that the car to be repaired is an autonomous car which is configured to connect directly to the communication node serving the one geo-fenced area which is actually entered by the car. Thereby, it is possible that the communication nodes can directly communicate with the car and can navigate and/or program the autonomous car to move autonomously through the plurality of geo-fenced areas according to the execution plan schedule. That means that, as the entire repair body shop is fragmented into geo-fenced areas, it is possible to program the car so that when a current vehicle repair stage has been completed, the car is ready to move autonomously to the next working station (geo-fenced area), i.e. repair stage. As it is further possible to connect to all of the cars which are within the car body shop at once, it is known if a next working station (geo-fenced area) has any space availability. If a next working station is free for the car to be moved to that working station, the car will be free to do so. The autonomous technology keeps a car from crashing into any obstacles along the way through the plurality of geo-fenced areas and will stop it, if necessary. Once the car has arrived at the next working station, i.e. repair stage in the respective geo-fenced area, the car is further configured to alert via a communication with the respective communication node serving that respective one geo-fenced area, the necessary parties via an appropriate user interface that the car is in place for the next repair step. If the next working station is not available, it is then decided whether to keep the car where it is until the next working station is free or to move it to a parking lot. Once in the parking lot, the car will remain in place until the next working station is free. Once the next working station is free, the car will be automatically alerted and will move autonomously inside to the appropriate next geo-fenced area incorporating the next working station.

The provided method allows to capture all movements within the car body shop including, but not limited to movements of personnel, vehicles, tools, parts, carts, and large equipment. The respective communication nodes serving the geo-fenced areas allow to capture data/signals including but not limited to temperature, VOCs, humidity, time offset, time onsite, time outside. It is possible to capture time and/or activity and/or status data in variant working stations or parking lots led out within and outside the car body shop. By way of a dashboard and/or a mobile application the user such as an owner, a manager, an employee and a customer will be able to track car status, parts status, tool location and large equipment performance. The dashboard can capture business and employee KPIs (key performance indicator) including time clock functionality, provide push reports and automated notifications. It can further provide proactive alerts if vehicles are taking longer than expected to repair. There can be a link to existing business systems such as estimating and management systems. Thus, further data, such as basic vehicle information, can be easily imported without manual data entry. The repair stage of the vehicle will be automatically updated based on where the vehicle has been and where the vehicle is currently.

The proposed method allows a repair stage updating, the provision of a health status, i.e. a performance progress, such performance progress being based on data collected for a vehicle location and status, a prediction of estimated hours for repair completion, real-time collection and analysis of smart beacon data from a car, staff and repair tools, and easy visualization and interpretation of collected data via a customizable dashboard and production view, wherein the dashboard can display vehicles and asset locations in real-time and support improved repair timing.

The proposed method enables a car body shop to be more successful by improving an operational efficiency of its repair processes. The proposed method enables real-time beacon data collection and analysis of multiple types of fixed and/or mobile entities within the car body shop including, for example, a car position with the time spent in each repair stage/geo-fenced area and additional applications such as car parts and technical tools. The collected and aggregated data are presented via a customizable dashboard that is intuitive with a minimum training required for a user.

The present invention further refers to a system to digitally track and monitor an automotive refinish repair process of a car within a car body shop. The system comprises at least one beacon which is provided at and/or inside the car to be repaired, a cloud server located in a cloud, at least one user interface, a plurality of geo-fenced areas into which the car body shop is divided, each geo-fenced area being served by at least one communication node. The at least one communication node is configured to pick up the at least one beacon at and/or within the car as soon as the car enters one geo-fenced area served by the at least one communication node. Further, the at least one communication node is configured to report and signal accordingly determined position/location data of the car to the cloud server. The at least one communication node is configured to capture, for the resistance time of the car within the respective one geo-fenced area, data such as time and/or activity and/or status data within the respective one geo-fenced area from at least one beacon inside the one geo-fenced area and being assigned to at least one item to be tracked, and to transmit the captured data to the cloud server, where the data are aggregated. The cloud server is configured to process the data and to update the repair stage of the car in a log file and/or database located in the cloud based on the processed data and wherein the user interface is configured to provide, based on the processed data and the updated repair stage, push reports and/or notifications and/or proactive alerts.

The updated repair stage of the car is available at the latest when the car leaves the respective one of the geo-fenced areas.

In a possible embodiment of the proposed system the system further comprises transport means which are configured to navigate automatically the car through at least some of the plurality of geo-fenced areas according to an execution plan schedule until the car reaches a last geo-fenced area according to the execution plan schedule and/or until an erroneous event is detected. It is also possible that the car is an autonomous car, i.e. a self-driving car that is capable of sensing its environment and navigating without human input through the plurality of geo-fenced areas according to the execution plan schedule, when the car is programmed accordingly.

According to an embodiment of the proposed system, the user interface is designed as a dashboard, providing a shop view and/or a production management board. The dashboard can be designed as a mobile application which can be implemented on an appropriate mobile device. A "shop view" means a virtual view to the car body shop so that a user is enabled to view and track all what happens within the car body shop in real-time.

The at least one communication node serving at least one geo-fenced area is configured to capture data concerning any one of the following items from respective beacons within the at least one geo-fenced area:

Temperature, VOCs, humidity, time offset, time onsite, time outside, movement of the car, movement of personnel, movement of tools, movement of parts, movement of carts, movement of large equipment inside the one geo-fenced area, activity of the car, activity of personnel, activity of tools, activity of parts, activity of carts, activity of large equipment inside the one geo-fenced area, status of the car, status of personnel, status of tools, status of parts, status of carts, status of large equipment inside the one geo-fenced area.

The proposed system is configured to perform a method as described before. The proposed method and system can be used within the scope of the present disclosure for any kind of repair process of a car.

The invention is further directed to a computer program product having instructions that are executable by a computer, the computer program product comprising instructions of:
A) navigating a car through at least some of a plurality of geo-fenced areas of a car body shop according to a pre-given execution plan schedule;
B) as soon as the car enters one of the geo-fenced areas:
    picking up at least one beacon located at and/or within the car by at least one communication node serving said geo-fenced area and reporting accordingly determined location data of the car to a cloud server, and
    capturing by the at least one communication node, for the residence time of the car within said geo-fenced area, data, particularly time and/or activity and/or status data within said geo-fenced area and transmitting the captured data to the cloud server;
C) processing the data in the cloud server;
D) updating a repair stage of the car in a log file and/or a database stored in the cloud based on the processed data, at the latest when the car leaves the one of the geo-fenced areas;
E) providing, based on the processed data and the updated repair stage, push reports and/or notifications and/or proactive alerts via a user interface; and
F) moving the car to one subsequent geo-fenced area according to the execution plan schedule and repeating the instructions B) to E) until the car reaches a last geo-fenced area according to the execution plan schedule and/or until an erroneous event is detected.

"Instructions", as used herein, can be read, interpreted, compiled, and/or executed and cause a computer, processor, or other electronic device to perform functions, actions and/or behave in a desired manner. The instructions may be embodied in various forms like routines, algorithms, modules, methods, threads, and/or programs including separate applications or code from dynamically linked libraries. It will be appreciated that computer-readable and/or executable instructions can be located in one logic and/or distributed between two or more communicating, co-operating, and/or parallel processing logics and thus can be loaded and/or executed in serial, parallel, and other manners.

The data which are captured can be time and/or activity and/or status data which are relevant for the automotive refinish repair process. Those data are captured from at least one beacon inside the one geo-fenced area by the at least one communication node serving the one geo-fenced area, the beacon being assigned to at least one item to be tracked. Generally, the at least one beacon is attached to the respective at least one item to be tracked. The at least one item to be tracked can be chosen from but is not limited to the group of items comprising the car to be repaired, a car part, an employee of the car body shop, a tool, a key, a parts cart. The at least one item to be tracked is located, at least for the residence time of the car within the one geo-fenced area, also within the one geo-fenced area. Thus, the communication node serving the one geo-fenced area can establish respective communicative connections to the respective beacons, respectively.

It is possible that the proposed system further comprises the database where the captured and/or aggregated data can be stored. The term "database" refers to a collection of related information that can be searched and retrieved. The database can be a searchable electronic numerical or textual document, a searchable PDF document, a Microsoft Excel® spreadsheet, a Microsoft Access® database, an Oracle® database, or a Linux database, each registered under their respective trademarks. A database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases. It is also possible to use MySQL.

The user interface can be realized via a computing device. The computing device used herein can refer to a data processing chip, a desktop computer, a laptop computer, a pocket PC, a personal digital assistant (PDA), a handheld electronic processing device, a smartphone that combines the functionality of a PDA and a mobile phone, or any other electronic device that can process information automatically. A computing device can be built into other electronic devices, such as a built-in data processing chip integrated into an imaging device, or another tool. A computing device can have one or more wired or wireless connections to a database, to another computing device, for example, to a cloud server, or a combination thereof. A computing device can be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive data through a wireless connection. A portable computing device includes a laptop computer, a pocket PC, a personal digital assistant, a handheld electronic processing device, a mobile phone, a smartphone that combines the functionality of a PDA and a mobile phone, a tablet computer, or any other electronic devices that can process information and data and can be carried by a person.

Wired connections include hardware couplings, splitters, connectors, cables or wires. Wireless connections and devices include, but are not limited to, WiFi device, Bluetooth device, wide area network (WAN) wireless device, local area network (LAN) device, infrared communication device, optical data transfer device, radio transmitter and optionally receiver, wireless phone, wireless phone adapter card or any other device that can transmit signals in a wide range of radio frequencies including visible or invisible optical wavelengths and electromagnetic wavelengths.

The present invention is further defined in the following examples. It should be understood that these examples, while indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

DETAILED DESCRIPTION OF THE FIGURES

Figure 1:
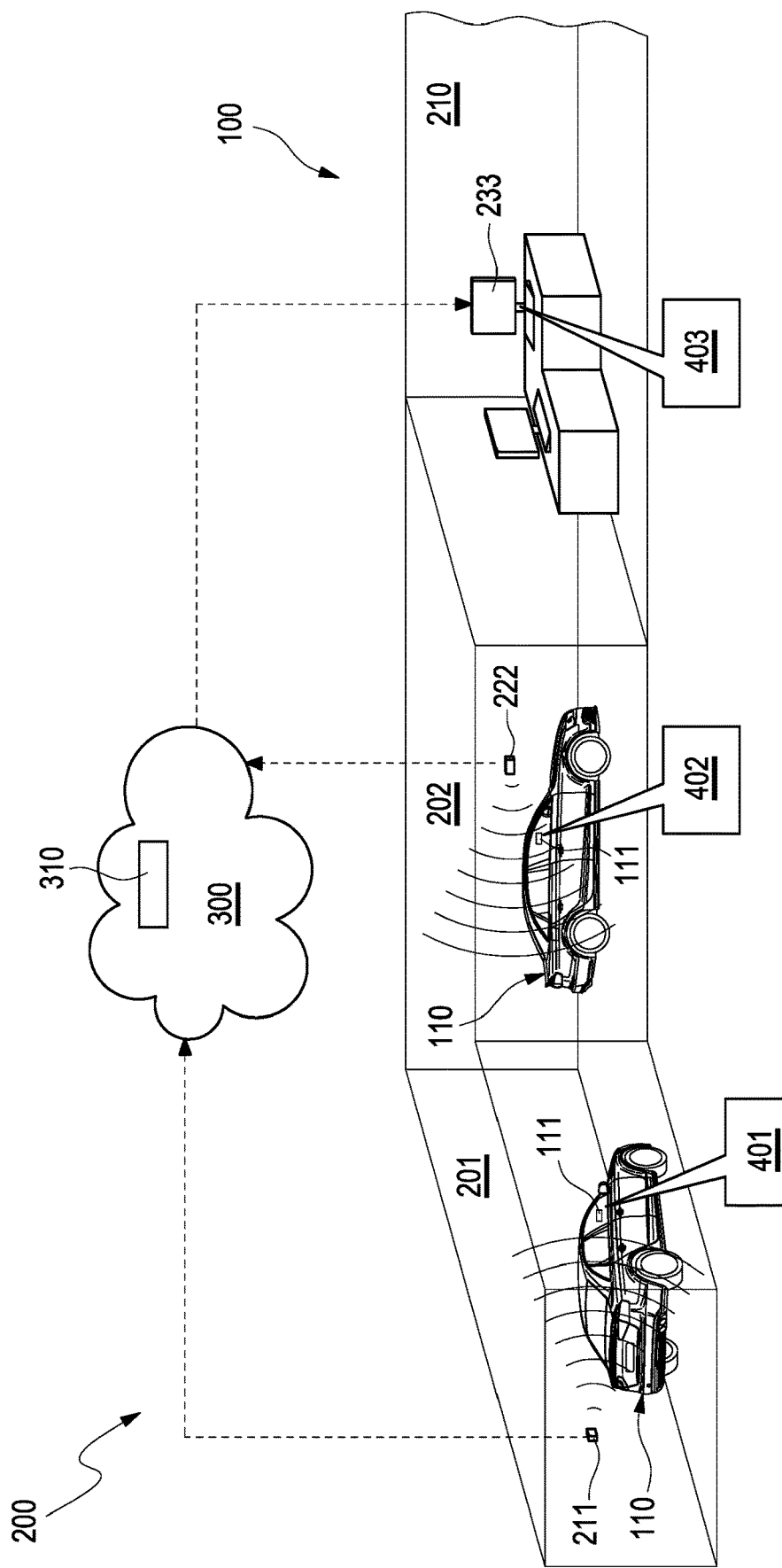
FIG. 1 shows an embodiment of the proposed system and illustrates an embodiment of the proposed method.

FIG. 1 shows an embodiment of the proposed system 200 to digitally track and monitor an automotive refinish repair process of a car 110 within a car body shop 100. The car 110 which is to be repaired is provided with at least one beacon 111 inside the car 110. The car body shop 100 is divided into a plurality of geo-fenced areas 201, 202. Each geo-fenced area 201, 202 is served by at least one communication node 211, 222.

In FIG. 1, the car 110 to be repaired is shown at different working stations within the car body shop 100. Each working station is assigned to one geo-fenced area 201, 202. In order to locate the car 110 to be repaired inside the car body shop 100, the beacon 111 inside the car 110 is picked up by the respective node 211, 222 serving the respective geo-fenced area 201, 202.

When the car 110 is located according to a first method step 401 in the first geo-fenced area 201 called "customer drop off" the beacon 111 inside the car 110 is picked up by the node 211 serving the geo-fenced area 201 "customer drop off". When the at least one beacon 111 within the car 110 is picked up by the at least one area specific node 211 serving the geo-fenced area "customer drop off" 201 the location of the car 110 can be determined and the determined location/position data of the car 110 are reported from the node 211 to a cloud server 310 located within a cloud 300. As long as the car 110 resides inside the geo-fenced area "customer drop off" 201 the at least one node 211 of the geo-fenced area 201 captures time and/or activity and/or status data within the geo-fenced area "customer drop off" 201 and transmits the captured data to the cloud server 310. The data are provided by respective beacons which are located in the geo-fenced area 201. Each beacon is assigned, particularly attached to one item to be tracked. Each beacon is in communicative connection, e. g. via Bluetooth, with the communication node 211 serving the geo-fenced area 201. Via this communicative connection, the sensed data are transmitted from the respective beacon to the communication node 211 which captures all those data from the different beacons and sends those data to the cloud server. The transmitted data are processed in the cloud server 310 and a repair stage of the car 110 is updated in a log file located/stored in a database in the cloud 300 based on the processed data when the car 110 leaves the geo-fenced area "customer drop off" 201. Based on the processed data and updated repair stage a push report and/or a notification and/or a proactive alert is provided by the cloud server 310 via a user interface 233 which is located in a remote area 210. The remote area 210 can be remotely located from the car body shop 100. The user interface 233 can be realized by a dashboard which can also be designed as a mobile application installed and implemented on a mobile device. As shown here, the user interface 233 can also be realized as a display of a personal computer or a laptop. The transmission of the push report and/or notification and/or alert is performed in real-time, i.e. during the automotive refinish repair process is ongoing. Thus, a user gets full transparency about the automotive refinish repair process in real-time. The push reports and/or notifications and/or alerts can be downloaded by the dashboard or pushed to the dashboard.

In the next method step 402 the car 110 is automatically navigated/moved to one subsequent geo-fenced area 202 "body" according to an execution plan schedule. As the car 110 moves, the beacon 111 within the car is picked up by a different node 222 serving the different geo-fenced area 202. As soon as the car 110 enters the geo-fenced area "body" 202, the at least one node 222 serving the geo-fenced area 202 picks up the at least one beacon 111 within the car 110 and signals accordingly determined location data of the car 110 to the cloud server 310. Further, the at least one node 222 serving the geo-fenced area 202 captures for the residence time of the car 110 within the geo-fenced area 202, time and/or activity and/or status data within the geo-fenced area 202 and transmits the captured data to the cloud server 310. The data are captured from at least one beacon, generally from a plurality of beacons inside the geo-fenced area "body". Each beacon is assigned, particularly attached to an item which is to be tracked. Such item can be the car 110 to be repaired, an employee of the car body shop 100, a tool of the car body shop, a car part, a parts cart, etc. Those data are again processed by the cloud server 310 and the repair stage of the car 110 is again updated based on the processed data when the car 110 leaves the geo-fenced area 202. The user is again provided in a method step 403 via the user interface 233 at the location 210 with a push report, and/or a notification and/or a proactive alert based on the processed data and the updated repair stage.

Generally, the user interface 233 which is generally implemented on a computing device is in communicative connection with the cloud server 310, particularly wirelessly via a cellular network. However, it is also possible that the communicative connection between the user display 233 and the cloud server 310 is realized in part by wired connection and in part by wireless connection. Wired connection can be realized by a glass-fibre or copper cables. When the car 110 leaves the geo-fenced area 202 the car 110 is again navigated/moved to one subsequent geo-fenced area according to the execution plan schedule until the car 110 reaches a last geo-fenced area according to the execution plan schedule or until an erroneous event is detected as a result of the processed data in the cloud server 310 and provided via a push report and/or notification and/or alert provided via the user interface 233.

The method as described herein allows an automated KPI (key performance indicator) data generation. Further, it allows a proactive automated production alert and a real-time location service which locates tagged items such as vehicles, keys, parts, tools, carts, equipment, etc. within the car body shop 100. Further, it is possible to provide via the user interface 233 a digital image of the car body shop 100 which can further be remotely monitored. The digital image of the car body shop 100 is dynamically changing simultaneously with the ongoing of the automotive refinish repair process. As already mentioned before, it is also possible that all data and reports, notifications and/or alerts are provided via a mobile application on a handheld device. The respective user which has access to the reports, notifications and/or alerts can take corrective action and act accordingly on the automotive refinish repair process.

The proposed method and system allow to identify bottlenecks, to receive proactive production alerts and, thus, to minimize faults during an automotive refinish repair process. The proposed automation further reduces manual efforts as the automative refinish repair process is automatically tracked and up-to-date KPIs are available at any time. Further, with the enhanced predictability of planning and scheduling, it is possible to effectively redeploy and manage given resources. Further, it is possible to monitor operations within the car body shop 100 for any location remotely in real-time. It is also possible to locate tagged items such as cars, tools, keys etc. quickly by means of a beacon assigned to each such item and the respective communication nodes serving the geo-fenced areas of the car body shop 100.

The transport means can be realized by a transport line in which the car to be repaired is automatically transported from working station to working station where individual repair steps are performed in sequence until the car is completely repaired and the repair process can be finished. By mechanically moving the car to be repaired from working station to working station, the repair process can be performed faster and with less labour then by having workers carrying out repair processes at a stationary car. As normally only one of the repair steps can be done at a time, in a repair line, the repair process is split between several working stations, all working simultaneously and being assigned to respective geo-fenced areas. When one working station is finished with the car, it passes it automatically on to the next working station. Thus, more than one car can be operated on/repaired at the same time, each one at a different stage of its repair process. i.e. at a different working station assigned to a different geo-fenced area. Thus, no loss of time when moving the car to be repaired from one working station to another, the longest stage on the repair line determines the throughput. Alternatively, it is possible that the car to be repaired is an autonomous car which navigates itself through the geo-fenced areas according to the execution plan schedule when being programmed accordingly.

As all those working stations and also respective parking lots of the car body shop are in communicative connection via the respective geo-fenced areas and the respective communication nodes, with the cloud server, it is possible to track and monitor in detail the whole repair process and all what happens at the single working stations. It is possible that each working station is assigned to exactly one geo-fenced area so that all data captured during the residence time of the car to be repaired within the respective one geo-fenced area give a clear and unambiguous conclusion about the status and the operating conditions of the respective working station located within the respective one geo-fenced area. It is also possible that each geo-fenced area is served by more than one communication node, particularly in the case when the geo-fenced area is quite large. The assignment of the working stations to respective geo-fenced areas is stored in a database, particularly located in the cloud, more particularly in the cloud server. Thus, it is possible to unambiguously assign respective captured data to a working station.

Based on the aggregated data which are provided via the user interface to a user, the user is enabled to draw conclusions about the status and functioning of a specific working station located within a specific geo-fenced area.

According to a possible embodiment of the proposed method, an autonomous car can be operated by remote control via a communicative connection of the communication nodes to a Bluetooth network in the car. By way of having the entire car body shop geo-fenced, it is possible to navigate the car from one geo-fenced area (working station/repair stage) to a next geo-fenced area (working station/repair stage). Thus, it is further possible to immediately notify when a current vehicle repair stage has been completed and the car is ready to move to the next repair stage. As all cars within the car body shop can be sensed via the communication nodes, it is known if the next repair stage has any space availability. If the next repair stage is free for the car to move to the next repair stage, the car will do so. Once the car has arrived at the next repair stage in the respective geo-fenced area, the necessary parties will be alerted (via the communication node serving the respective geo-fenced area and a respective user interface being in connection with the communication node) that the car is in place for the next repair step.

If the next repair stage is not available it is decided whether to keep the car where it is until the next repair stage is free or to move the car to a parking lot. Once the car is in the parking lot, it will remain in place until the next repair stage is free. Once it is free the car will be alerted and will move to the next repair stage.

The communication with the car is to be realized via the communication nodes serving the plurality of geo-fenced areas and being in connection with the car via Bluetooth. The communication nodes can be further connected to a user interface via a cellular network so that a remote control of the car can be realized.

Figure 2:
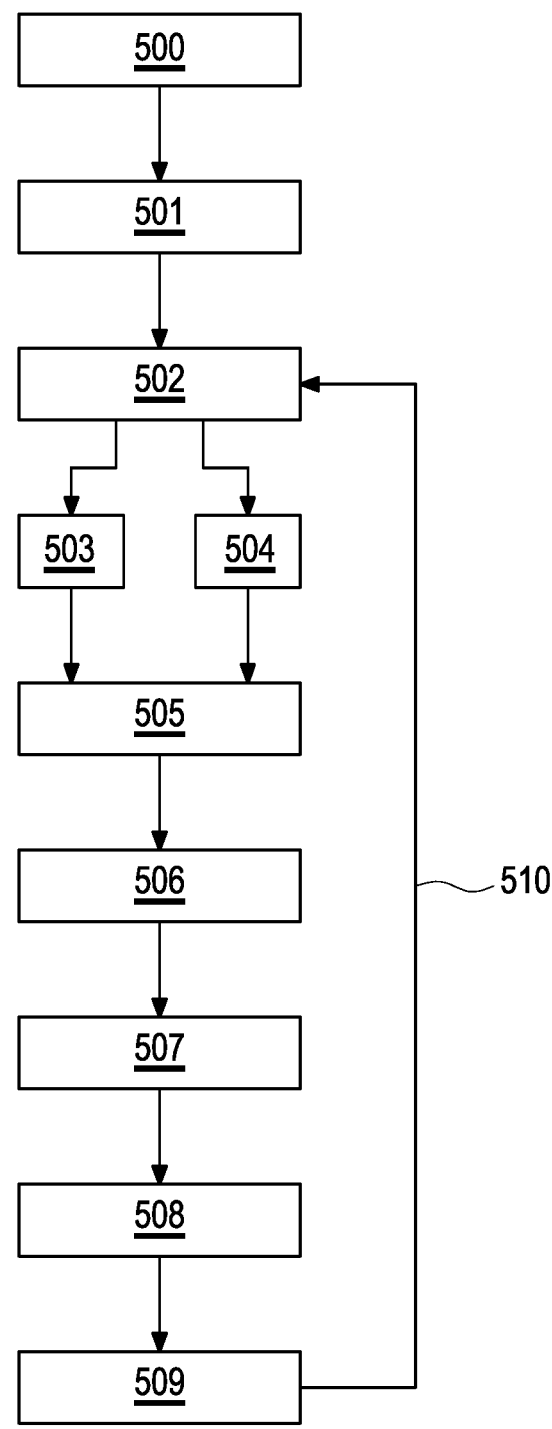
FIG. 2 shows a flow diagram illustrating a further embodiment of the proposed method.

FIG. 2 shows a schematic flow diagram of an embodiment of the proposed method to digitally track and monitor an automotive refinish repair process of a car within a car body shop. The car to be repaired is provided with at least one beacon at and/or inside the car and the car body shop is divided into a plurality of geo-fenced areas. Each geo-fenced area is served by at least one communication node. Generally, there is a plurality of communication nodes wherein the communication nodes are a pre-given distance apart from each other, thus forming a network/mesh of communication nodes with a pre-given topology. The topology of the communication nodes can be described by parameters, such as the pre-given distance between the communication nodes.

In a step 500, the car to be repaired is navigated through at least some of the plurality of geo-fenced areas according to a pre-given execution plan schedule, i.e. a pre-given repair plan schedule. As soon as the car enters in a step 501 one of the geo-fenced areas, the at least one beacon at or inside the car is picked up, in a step 502, by the at least one communication node which serves the one geo-fenced area which was entered by the car. In a step 503, location/position data/signals of the car are reported/signalled from the communication node to a cloud server. The location/position data can be sensed directly by the communication node itself, via a measured distance of the detected beacon to the communication node, or by the beacon, via a measured distance of the detected beacon to the communication node, which transmits the position data to the communication node, from which the data are further transmitted to the cloud server.

In a step 504, the at least one communication node captures, for the residence time of the car within the one geo-fenced area which is served by the at least one communication node, time and/or activity and/or status data relevant for the automotive refinish repair process within the one geo-fenced area. The data are captured from at least one beacon within the one geo-fenced area. Generally, there is a plurality of beacons, each beacon being assigned to an item to be tracked and configured to sense a specific kind of data. Each beacon has sensing capabilities of at least one sensor of the group of thermometer, hygrometer, position meter, acceleration meter, moving meter. Generally, all of the beacons are configured the same and track the same data. The captured data are transmitted, in a step 505, via a wireless network, to the cloud server.

In a further step 506, the data are processed, i.e. analysed, filtered, aggregated by the cloud server. In a step 507, generally when the car leaves the one of the geo-fenced areas, a repair stage of the car is updated, based on the processed data. The updated repair stage is stored in a log file and/or a database located in the cloud.

In a step 508, based on the processed data and the updated repair stage, push reports and/or notifications and/or proactive alerts are provided via a user interface.

In a subsequent step 509, the car is navigated, particularly automatically to one subsequent geo-fenced area according to the execution plan schedule.

The steps 502 to 509 are repeated, as indicated by arrow 510, until the car reaches a last geo-fenced area according to the execution plan schedule and/or until an erroneous event is detected.

The invention claimed is:

1. A method to digitally track and monitor an automotive refinish repair process of a car within a car body shop, wherein at least one beacon is assigned to the car, wherein the at least one beacon has sensing capabilities of at least a thermometer, a hygrometer and a chronometer, and the car body shop is divided into a plurality of working stations, each working station being assigned to one of a plurality of geo-fenced areas, each geo-fenced area being served by at least one communication node, the method comprising at least the following steps:

a) navigating the car through the plurality of geo-fenced areas according to a pre-given execution plan schedule, b) as soon as the car enters one of the geo-fenced areas:
picking up the at least one beacon assigned to the car by the at least one communication node serving said geo-fenced area and signalling accordingly determined position data of the car to a cloud server, and
capturing, by the at least one communication node serving said geo-fenced area, for a residence time of the car within said geo-fenced area, data within said geo-fenced area and transmitting the captured data to the cloud server, wherein the captured data further comprises temperature data inside the geo-fenced area, humidity data inside the geo-fenced area, and different time data, c) processing the data in the cloud server, wherein the captured data are merged, and wherein the cloud server associates the processed data with a working station assigned to said geo-fenced area, d) updating a repair stage of the car in at least one of a log file and a database located in the cloud server based on the processed data, e) providing, based on the processed data and the updated repair stage, at least one of push reports, notifications, and alerts via a user interface, f) determining whether a subsequent working station for a subsequent repair stage according to the execution plan schedule is available, the subsequent working station assigned to a subsequent geo-fenced area, wherein availability of the subsequent working station is determined based on data stored in the cloud server that is associated with a repair stage of at least one other car within the car body shop, and g) if the subsequent working station is available as determined at step f), automatically moving the car to the subsequent geo-fenced area according to the execution plan schedule and repeating steps b) to f) until at least one of: (i) the car reaches the last geo-fenced area according to the execution plan schedule, and (ii) an erroneous event is detected.

2. The method according to claim 1, wherein the processed data and the updated repair stage are transmitted together with the at least one of push reports, notifications, and alerts from the cloud server to a dashboard.

3. The method according to claim 2, wherein the dashboard is designed as at least one of a mobile application and a website which can be implemented on at least one of a mobile device and a computer.

4. The method according to claim 1, wherein the at least one of push reports, notifications, and alerts are dynamically generated and transmitted to a dashboard on a regular basis.

5. The method according to claim 4, wherein an output of the at least one of push reports, notifications, alerts is in the form of one of plain text, HTML, and file attachments.

6. The method according to claim 1, wherein a user is allowed to view the at least one of push reports, notifications, and alerts via the user interface provided the user has appropriate access rights.

7. The method according to claim 1, wherein user specific filters for the at least one of push reports, notifications, and alerts which are to be provided via the user interface are instantiated.

8. The method according to claim 1, wherein the at least one communication node further captures data concerning any one of the following items: VOCs, time offsite, time onsite, time outside, movement of the car, movement of personnel, movement of tools, movement of parts, movement of carts, movement of large equipment inside the one geo-fenced area, activity of the car, activity of personnel, activity of tools, activity of parts, activity of carts, activity of large equipment inside the one geo-fenced area, status of the car, status of personnel, status of tools, status of parts, status of carts, status of large equipment inside the one geo-fenced area.

9. The method according to claim 1, wherein the at least one of push reports, notifications, and alerts are provided via the user interface instantaneously during the automotive refinish repair process.

10. A non-transitory computer-readable storage medium comprising instructions that are executable by one or more processors, wherein the instructions cause the one or more processors to digitally track and monitor an automotive refinish repair process of a car within a car body shop, wherein at least one beacon is assigned to the car to be repaired and the car body shop is divided into a plurality of working stations, each working station being assigned to one of a plurality of geo-fenced areas, each geo-fenced area being served by at least one communication node, by configuring the one or more processors to:
  a) navigate the car through the plurality of geo-fenced areas according to a pre-given execution plan schedule,
  b) as soon as the car enters one of the geo-fenced areas:
    pick up the at least one beacon assigned to the car by the at least one communication node serving said geo-fenced area and signal accordingly determined position data of the car to a cloud server, wherein the at least one beacon has sensing capabilities of at least a thermometer, a hygrometer and a chronometer, and
    capture, by the at least one communication node serving said geo-fenced area, for a residence time of the car within said geo-fenced area, data within said geo-fenced area and transmit the captured data to the cloud server, wherein the captured data further comprises temperature data inside the geo-fenced area, humidity data inside the geo-fenced area, and different time data,
  c) process the data in the cloud server, wherein the captured data are merged, and wherein the cloud server associates the processed data with a working station assigned to said geo-fenced area,
  d) update a repair stage of the car in at least one of a log file and a database located in the cloud server based on the processed data,
  e) provide, based on the processed data and the updated repair stage, at least one of push reports, notifications, and alerts via a user interface,
  f) determine whether a subsequent working station for a subsequent repair stage according to the execution plan schedule is available, the subsequent working station assigned to a subsequent geo-fenced area, wherein availability of the subsequent working station is determined based on data stored in the cloud server that is associated with a repair stage of at least one other car within the car body shop, and
  g) if the subsequent working station is available as determined at step f), move automatically the car to the subsequent geo-fenced area according to the execution plan schedule and repeat instructions b) to f) until at least one of: (i) the car reaches the last geo-fenced area according to the execution plan schedule, and (ii) an erroneous event is detected.

11. A system to digitally track and monitor an automotive refinish repair process of a car within a car body shop, the system comprising at least one beacon assigned to the car to be repaired, wherein the at least one beacon has sensing capabilities of at least a thermometer, a hygrometer and a chronometer, the system further comprising a cloud server, at least one user interface, a plurality of working stations into which the car body shop is divided, each working station being assigned to one of a plurality of geo-fenced areas, each geo-fenced area being served by at least one communication node, wherein the at least one communication node is configured to pick up the at least one beacon within the car as soon as the car enters a respective one geo-fenced area, and to signal accordingly determined position data of the car to the cloud server, and wherein the at least one communication node serving the one geo-fenced area is configured to capture for a residence time of the car within the respective one geo-fenced area, data within the respective one geo-fenced area, wherein the captured data further comprises temperature data inside the geo-fenced area, humidity data inside the geo-fenced area, and different time data, and to transmit the captured data to the cloud server, wherein the cloud server is configured to merge the captured data, process the merged data, associate the processed data with a working station assigned to the geo-fenced area, update a repair stage of the car in at least one of a log file and a database located in the cloud based on the processed data, and store data associated with a repair stage of at least one other car within the car body shop and indicative of an availability of a subsequent working station for a subsequent repair stage according to a pre-given execution plan schedule, the subsequent working station assigned to a subsequent geo-fenced area, and wherein the user interface is configured to provide, based on the processed data and the updated repair stage, at least one of push reports, notifications, and alerts.

12. The system according to claim 11, which further comprises a transport line which is configured to move automatically the car through the plurality of the geo-fenced areas according to an execution plan schedule until at least one of: (i) the car reaches the last geo-fenced area according to the execution plan schedule, and (ii) an erroneous event is detected.

13. The system according to claim 11, wherein the user interface is designed as a dashboard.

14. The system according to claim 13, wherein the dashboard is designed as one of a mobile application and a website which can be implemented on at least one of a mobile device and a computer.

15. The system according to claim 11, wherein each of the at least one communication node serving at least one of the plurality of geo-fencing areas is configured to further capture data concerning any one of the following items: VOCs, time offsite, time onsite, time outside, movement of the car, movement of personnel, movement of tools, movement of parts, movement of carts, movement of large equipment inside the one geo-fenced area, activity of the car, activity of personnel, activity of tools, activity of parts, activity of carts, activity of large equipment inside the one geo-fenced area, status of the car, status of personnel, status of tools, status of parts, status of carts, status of large equipment inside the one geo-fenced area.

16. The system according to claim 11 which is configured to perform a method comprising:
   a) navigating the car through the plurality of geo-fenced areas according to a pre-given execution plan schedule,
   b) as soon as the car enters one of the geo-fenced areas:
      picking up the at least one beacon assigned to the car by the at least one communication node serving said geo-fenced area and signalling accordingly the determined position data of the car to a cloud server, and
      capturing, by the at least one communication node serving said geo-fenced area, for the residence time of the car within said geo-fenced area, the data within said geo-fenced area and transmitting the captured data to the cloud server, wherein the captured data include also data other than position data, the other data including temperature data inside the geo-fenced area, humidity data inside the geo-fenced area, and different time data,
   c) processing the data in the cloud server, wherein the captured data are merged, and wherein the cloud server associates the processed data with a working station assigned to said geo-fenced area,
   d) updating a repair stage of the car in at least one of a log file and a database located in the cloud server based on the processed data,
   e) providing, based on the processed data and the updated repair stage, at least one of push reports, notifications, and alerts via a user interface,
   f) determining whether a subsequent working station for a subsequent repair stage according to the execution plan schedule is available, the subsequent working station assigned to a subsequent geo-fenced area, wherein availability of the subsequent working station is determined based on data stored in the cloud server that is associated with a repair stage of at least one other car within the car body shop, and
   g) if the subsequent working station is available as determined at step f), automatically moving the car to the subsequent geo-fenced area according to the execution plan schedule and repeating steps b) to f) until at least one of: (i) the car reaches the last geo-fenced area according to the execution plan schedule, and (ii) an erroneous event is detected.

* * * * *